A. C. FLETCHER.
Car Wheel.
No. 89,752.  Patented May 4, 1869.
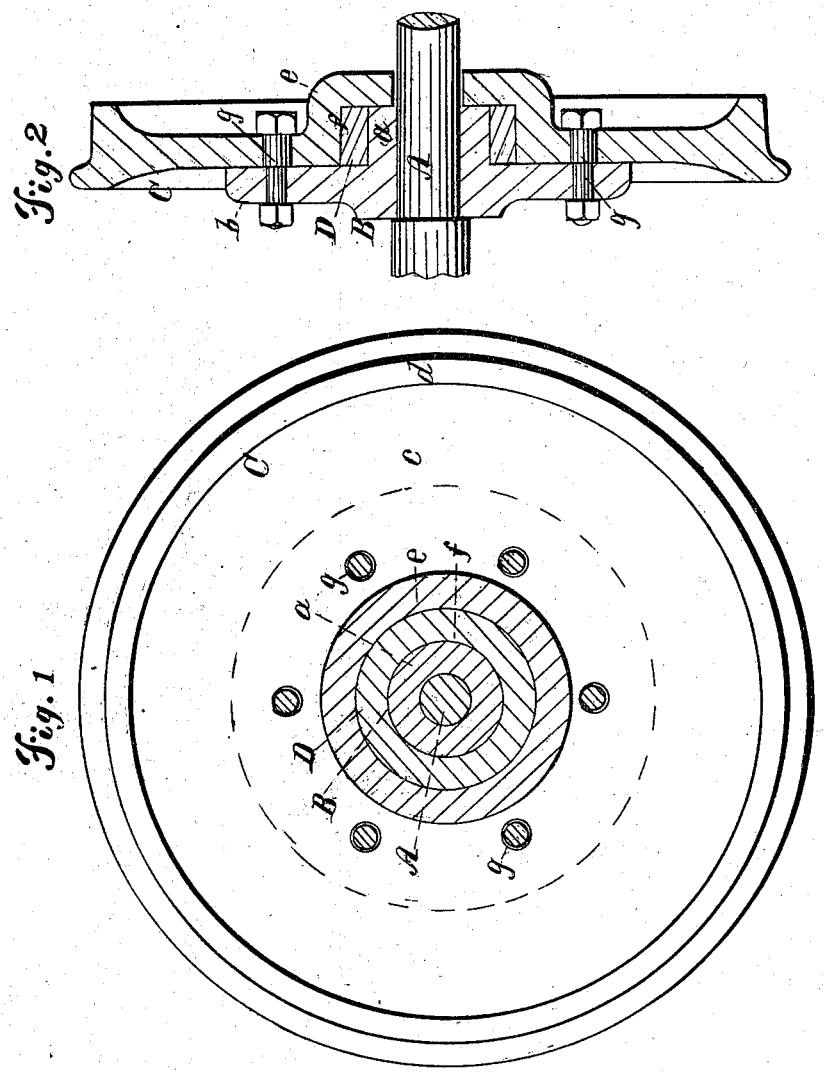

UNITED STATES PATENT OFFICE.

ADDISON C. FLETCHER, OF NEW YORK, N. Y.

IMPROVED RAILWAY-CAR WHEEL.

Specification forming part of Letters Patent No. 89,752, dated May 4, 1869.

*To all whom it may concern:*

Be it known that I, ADDISON C. FLETCHER, of the city, county, and State of New York, have invented a new and useful Improvement in Car-Wheels, of which the following is a full, clear, and exact description, reference being had to the accompanying drawing, forming part of this specification, and in which—

Figure 1 represents a partially-broken inside face view of a railroad-car wheel constructed in accordance with my improvement, and Fig. 2 a transverse section of the same.

Similar letters of reference indicate corresponding parts.

My improvement has reference to car-wheels which have an elastic character or action given them by means of springs interposed between their treads and axles; and the invention consists in a certain combination and construction of the hub portion of the wheel which is made fast to the axle, an independent web and tread portion that is united in a free manner as regards transverse play to the hub, and an india-rubber or other like spring arranged between the hub and eye of the web portion of the wheel, which latter, as thus constructed, unites simplicity with efficiency.

Referring to the accompanying drawing, A represents a portion of one of the axles of a railroad-car, and B the hub of one of the wheels, which hub is firmly and immovably secured to the axle, and is formed of an outer eye portion, $a$, and inside flange $b$. C is the main body of the wheel, made up of a web, $c$, rim or tread $d$, and eye or socket portion $e$, the latter being made to establish an annular recess, $f$, around the eye portion $a$ of the hub, and a shoulder against which the outer end of said eye portion of the hub bears, and through which the axle projects in a loose or free manner, so as to admit of transverse play of the body C relatively to the axle. The flange $b$ of the hub bears or butts up against the inside face of the web $c$, and the two main portions or sections B and C of the wheel as thus arranged are united by cross-belts and nuts $g\ g$ or other suitable ties in such manner as not to restrict the main body C of the wheel from transverse play in relation to the axle. D is an india-rubber ring, or other suitable spring, arranged within the recess $f$, surrounding the eye of the hub, and serving to form an elastic support to the body C around the eye of the hub.

This forms a cheap, simple, and durable construction of car-wheel made up of independent sections, free from lateral play or shake of its parts, but having the most perfect elasticity, as regards play of its body transversely to the axle in passing over irregularities on the road, and yet having its hub in rigid connection with the axle.

Another mode of describing this invention is to refer to the hub of the wheel as made up of two independent portions, fitting the one, $e$, as a sleeve over the other portion, $a$, and holding the spring D in between them, thus making the entire hub a box or case for the spring, which bears upon or against the two independent portions of said hub.

What is here claimed, and desired to be secured by Letters Patent, is—

A car-wheel consisting of the hub portion B, to be keyed upon the axle, and the tread or body portion C, having an interposed yielding substance, D, and a central orifice slightly larger than the axle, so connected as to be capable of radial motion to the extent of the difference in diameter of the axle and the orifice in the center of the body of the wheel, substantially as shown and described.

ADDISON C. FLETCHER.

Witnesses:
FRED. HAYNES,
J. W. COOMBS.